(Model.)
A. C. CAREY.
Pastel.
No. 240,384.  Patented April 19, 1881.
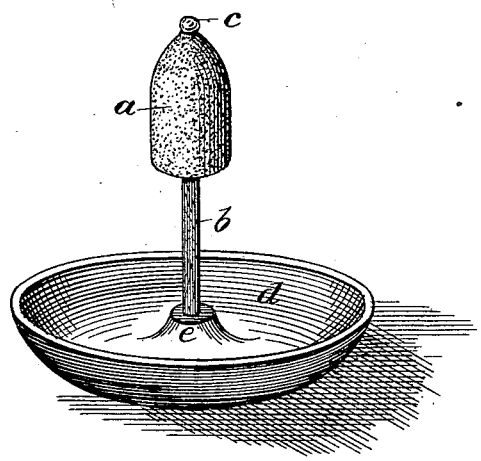
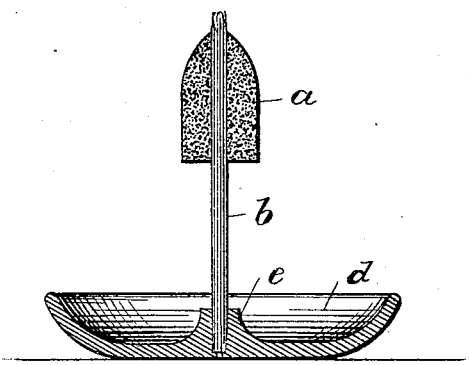
Attest:
H. L. Pernie
Geo. M. Finckel
Inventor.
Augustus C. Carey,
by his attorney,
Wm. H. Finckel

United States Patent Office.

AUGUSTUS C. CAREY, OF BOSTON, MASSACHUSETTS.

PASTIL.

SPECIFICATION forming part of Letters Patent No. 240,384, dated April 19, 1881.

Application filed November 19, 1880. (Model.)

*To all whom it may concern:*

Be it known that I, AUGUSTUS C. CAREY, a citizen of the United States, residing at Boston, in the county of Suffolk and State of Massachusetts, have invented certain new and useful Improvements in Pastils; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in pastils for fumigating, deodorizing, disinfecting, and insect-destroying purposes; and the invention has for its object the furnishing of such pastils in convenient form for use.

The invention consists in a pastil composed of a friction-match having a pastil composition attached to its stick or stem, as hereinafter specified and claimed.

In the accompanying drawings illustrating my invention, in the several figures of which like parts are similarly designated, Figure 1 is a perspective view of my pastil and holder. Fig. 2 is a longitudinal vertical section of the same, and Fig. 3 is a perspective view of the pastil composition detached.

In practicing my invention I take the pastil composition of the desired quality or kind in plastic form, and having prepared molds of conical, conoidal, or other desired shape, and friction-matches having sticks or stems of wood or other material of suitable length—say two inches—I mold the composition about said sticks or stems and allow it to dry thereon so as to adhere thereto.

In the drawings, $a$ designates the composition, and $b$ the match stick or stem. The pastil composition will have, as usual, some nitrous or combustible material in it, so as to permit of the ignition and consumption thereof.

I provide the pastil with an external fulminating or other substance capable of ignition by friction, so that the pastil may be self-ignitible, and to this end the sticks or stems are ordinary friction-matches, the head of which, as at $c$, will project beyond the apex or smaller end of the pastil, so that by scraping and igniting the match and holding it inverted for a few seconds, combustion may be started in the pastil, when it may be held upright for use.

As a convenient means for holding the pastils when burning I provide a dish or plate, $d$, of earthenware or other suitable material, in which is a socketed portion, $e$, to receive and hold the stick $b$, as illustrated in Figs. 1 and 2. This dish will serve to catch the ashes or consumed portions of the pastils, and furnishes a neat and convenient holder for burning pastils.

A modification of my invention would consist of a plain stick, as in Fig. 2, having a splintered, easily-ignitible portion projecting beyond the composition, so as to facilitate ignition of the composition; or such stick may be cut off even with the top of the composition, or may be inserted in a socket made in the lower portion of the composition. In such cases the pastil will be ignited by any suitable extraneous fire; but my invention in its most desirable form has the pastil composition molded on the ordinary friction-match.

I do not limit my invention to any particular composition of pastil, it being understood that it is primarily designed for furnishing an easily handled and convenient form of burning—that is to say, pyrotechnic or fumigating pastil.

By using the match-stick the pastil composition need not be handled, and every portion of it may be consumed without affecting, by discoloration or otherwise, its dish or holder.

By furnishing the holder a convenient, readily accessible, and cheap form of pastil-receptacle is afforded.

The use of friction-matches for sticks will be appreciated as a convenient and handy arrangement for igniting the pastil, and the sticks also serve a useful purpose in furnishing carbonaceous matter to assist in the burning of the pastil.

It is designed to supply these pastils to the trade with the holders, a purchaser obtaining the holder and using it indefinitely.

The shape and size of the composition may be varied, and the length and relative arrangement of the stick and composition may be changed.

I am aware that a friction-match has been made in which the head, capable of burning like a coal, is perfumed, arranged upon a stick or glass stem and tipped with a fulminate.

I am aware, also, that a cigar-lighter has been made of a similar composition and provided with a pin whereby it may be attached to a cigar.

My invention is designed to afford a convenient means for using pastils. So far as I know pastils have heretofore been furnished in the form of cubes of matter, which have to be handled carefully, and when to be burned are placed in some household china, which is usually ruined thereafter. I provide the pastils with the stick for convenience in handling, and use a specially-prepared holder in which they are burned. Pyrotechnic materials may be made up in this shape also.

What I claim is—

1. A pastil composed of a friction-match having a pastil composition attached to its stick or stem, substantially as and for the purpose described.

2. A friction-match combined with the composition $a$, molded or secured about its stick or stem $b$, substantially as shown, and for the purpose described.

In testimony whereof I affix my signature in presence of two witnesses.

AUGUSTUS C. CAREY.

Witnesses:
CHARLES P. COFFIN,
JOHN F. ANDREW.